United States Patent [19]

Borlinghaus

[11] Patent Number: 4,664,351

[45] Date of Patent: May 12, 1987

[54] LOW PROFILE SEAT ADJUSTER WITH LIFT PLATE STABILIZER

[75] Inventor: Hans J. Borlinghaus, Utica, Mich.

[73] Assignee: General Motors Corporation, Detroit, Mich.

[21] Appl. No.: 824,025

[22] Filed: Jan. 30, 1986

[51] Int. Cl.⁴ ............................................. F16M 13/00
[52] U.S. Cl. ................................... 248/396; 248/394; 248/422
[58] Field of Search ................ 248/396, 394, 393, 422

[56] References Cited

U.S. PATENT DOCUMENTS 3,182,947  5/1965  Tanaka ................................ 248/421
3,951,004  4/1976  Heesch ................................ 74/89.15

Primary Examiner—Thomas F. Callaghan
Attorney, Agent, or Firm—Ernest E. Helms

[57] ABSTRACT

The present invention provides a method and apparatus for a low profile seat adjuster with a lift plate stabilizer interlock. The lift plate interlock provides torsional stabilization for the lift plate preventing the lift plate being urged into interference with other members of the seat adjuster therefore reducing friction in the adjuster. The reduced friction in the operation of the adjuster allows the seat adjuster to exhibit a smooth and constant movement when adjusting the seat.

13 Claims, 7 Drawing Figures

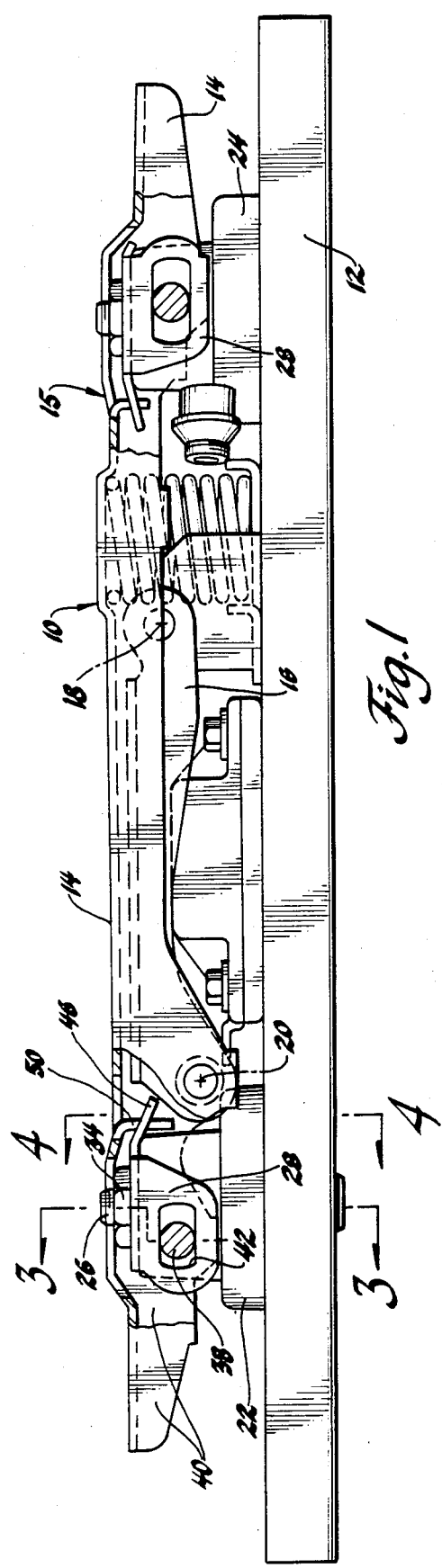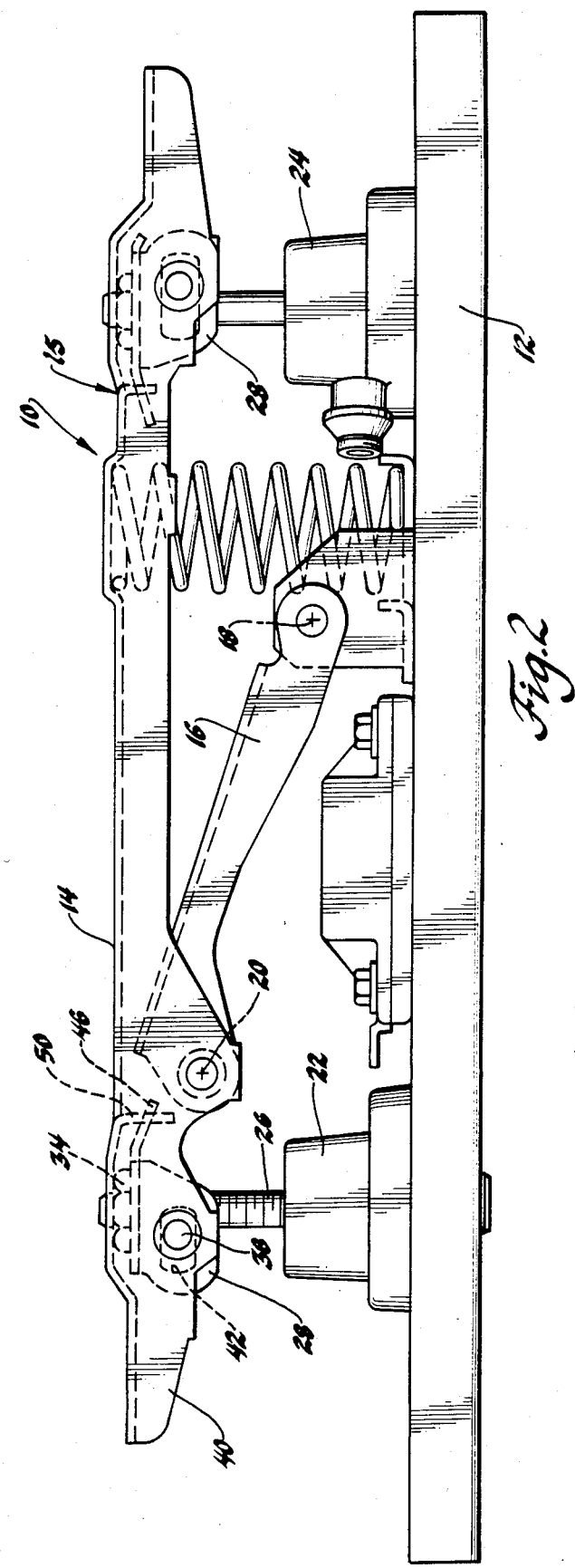

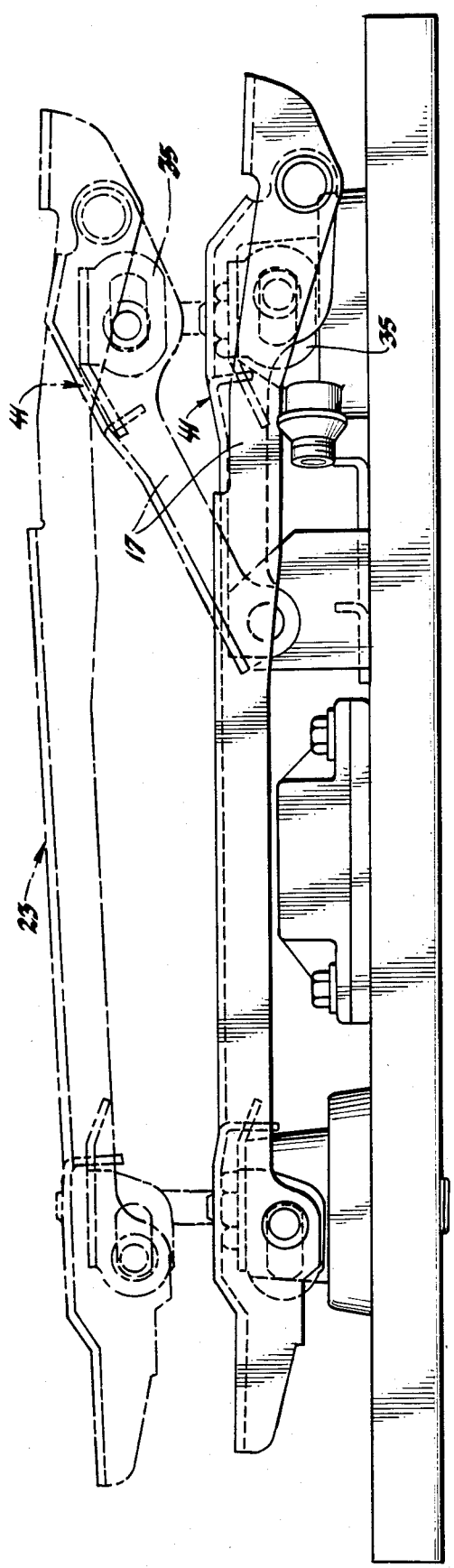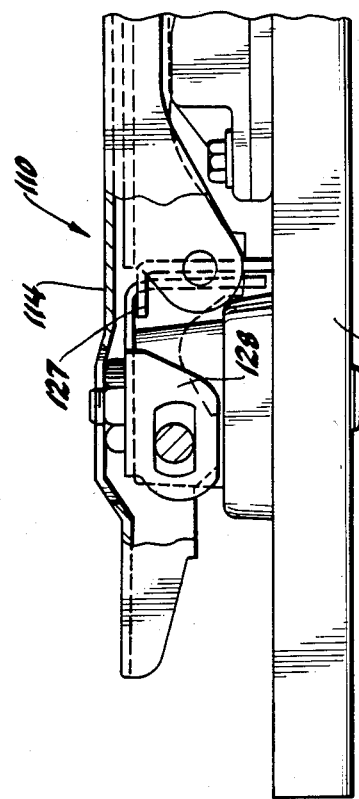

LOW PROFILE SEAT ADJUSTER WITH LIFT PLATE STABILIZER

FIELD OF THE INVENTION

The field of the present invention is that of seat adjusters. More particularly, the field of the present invention relates to powered vehicle seat adjusters. Still, more particularly, the present invention relates to powered seat adjusters which allow the seat to be adjusted to a desired elevation and pitch.

DISCLOSURE STATEMENT

It is known in the art to provide seat adjusters for a vehicle wherein the forward end elevation of the seat or the rearward end elevation of the elevation may be set independently. A typical seat adjuster has a floor plate (sometimes referred to as an upper channel) slidably mounted on a channel (sometimes referred to as a lower channel) for forward and rearward movement within the vehicle. The floor plate will typically have a lifting mechanism at its fore and aft end allowing adjustment of the seat elevation and pitch.

Typically, powered seat adjusters will have a top plate which is generally parallel with the floor plate. To add support, the top plate and floor plate are connected by a rigid link pivotally connected to the top plate and floor plate along the rigid link's opposite ends. Also provided at the fore and aft positions of the fore plate are two lift assemblies. The lift assemblies include a non-rotating jack screw which is raised and lowered by a powered gearing system.

The lift assembly also has fixably connected to the top of the jack screw, a lift plate (sometimes referred to as a slider washer) which is a substantially thin elongated member which fits into a thin elongated fore and aft slot of the top plate. The lift plate is retained on the top plate by a nut and washer combination. Note in an alternative version, the top plate extends into a thin elongated fore and aft longitudinal slot of the rigid link.

To adjust the seat, the first or second lift assemblies are selectively raised or lowered. The rigid connecting link, which has a fixed rotational axis with the top plate and the floor plate pivots with a fixed arch. Therefore, the lift assembly connection to the top plate and/or rigid link (support assembly) must provide for sliding as well as pivotal motion.

To aid in meeting height requirements within the vehicle enclosure, it is desirable to lower the profile of the seat adjuster. An adjuster with a lower profile is shown and described in Tanaka, U.S. Pat. No. 3,182,947, commonly assigned. In Tanaka, the lift plate is widened and the top plate is formed from a channel-like member having parallel opposed slotted apertures allowing the pivoting loss motion connection between the lift plate and the top plate to be made along the side instead of upon the top as previously designed. The above design allows elimination of some of the hardware which was previously placed on top of the top plate (i.e. nut and washers), and the top plate itself may be totally cut out in the portion directly above the lift plate as shown in Tanaka in FIGS. 3 and 4.

Low profile seat adjusters, however, experience an operational difficulty which was not previously exhibited. At the end of travel in the upward or downward direction, the jack screw will be urged slightly to rotate even though it is retained by the overlap of the top plate with the lift plate. However, this overlap of the top plate and lift plate will have a slight clearance. The lift plate at the end of travel of the jack screw will be slightly rotated into an interference position with the top plate. This interference will cause intermittent freezing of the parts thereby giving the seat an uneven and jerking vertical motion. The intermittent freeing and jerking free motion, although not critical in the functional operation of the seat adjuster, will sometimes cause the seat to have an unstable feeling to the occupant.

SUMMARY OF THE INVENTION

To overcome the above-noted and other problems the present invention is brought forth. The present invention is a low profile seat adjuster apparatus and method wherein the lift plate is torsionally stabilized. The torsional stabilization of the lift plate member prevents the lift plate from aligning itself into an interference relationship with the top plate or other members of the seat adjuster. In a preferred embodiment the torsional stabilization is achieved by a fork and tongue (or sliding finger) interlock of the top plate with the lift plate. In an alternative preferred embodiment of the torsional stabilization apparatus is provided by an interlock of the rigid link with the lift plate.

It is an object of the present invention to provide a seat adjuster having a floor plate, a support assembly including a top plate having an upper surface parallel to the floor plate and a rigid link pivotally connected with the top plate and floor plate wherein said support assembly has a side surface slottably connected with a lift plate which is fixably connected with a jack screw and wherein there are means provided for torsionally restraining the top plate. It is also an object of the present invention to provide a low profile seat adjuster which exhibits a decreased tendency of sticking and has smoother operational characteristics in raising and lowering. It is also an object of the present invention to provide an improved method of vertically adjusting a seat.

Other objects and advantages of the present invention will become more apparent to those skilled in the art as the nature of the invention is better understood from the accompanying drawings and a detailed description.

BRIEF DESCRIPTION OF THE DRAWINGS

FIG. 1 is a plain elevational partially sectional view of an embodiment of the present invention in the lowered position.

FIG. 2 is a plain elevational view of the seat adjuster illustrated in FIG. 1 in the raised position.

FIG. 6 illustrates an alternative embodiment of the present invention in the lower and raised position.

FIG. 7 is a partial plain elevational view of an interlocking device fixedly connected to the floor plate.

DETAILED DESCRIPTIONS OF THE DRAWINGS

Figure 4:
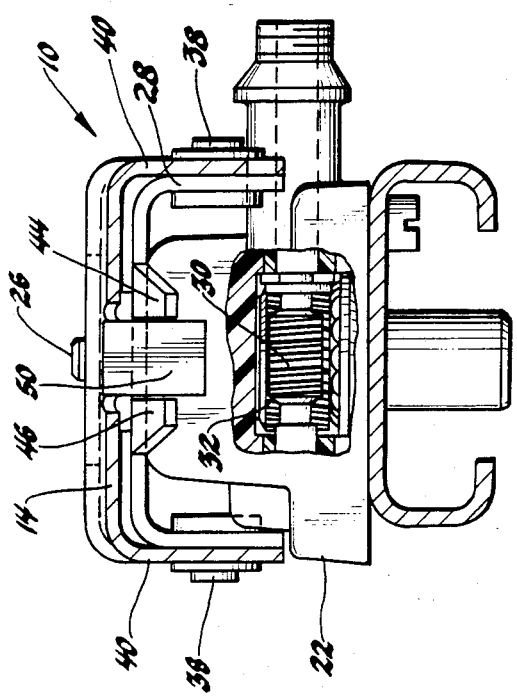
FIG. 4 is a partial sectional view taken along line 4—4 of FIG. 1.
Figure 3:
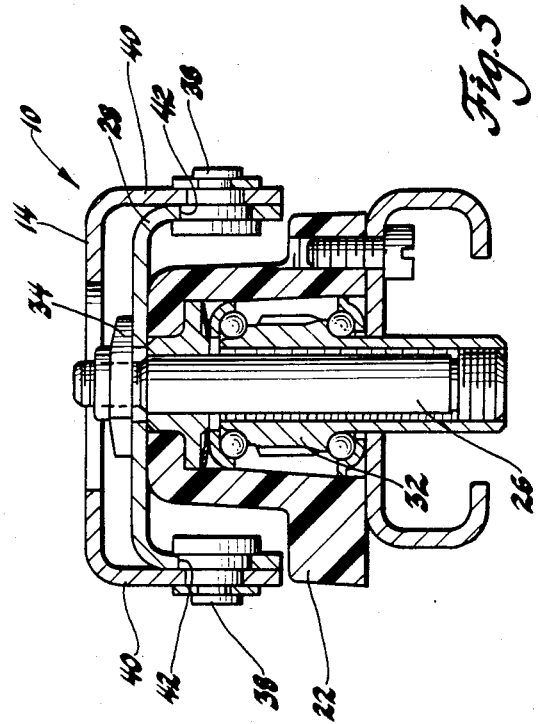
FIG. 3 is a sectional view taken along line 3—3 of FIG. 1.

Referring to FIGS. 1 and 2, seat adjuster assemblies are usually comprised of five major elements. The first element is the floor plate 12. The second element is the top plate 14 which is generally parallel to the floor plate and provides the surface on which the vehicle seat is attached. Connecting the floor plate 12 with the top plate 14 is a rigid link 16. The rigid link 16 is pivotally connected to the top plate 14 and floor plate 12 at its opposite ends having fixed axis 18 and 20 of rotations therewith. To vertically adjust the seat there is provided a fore and aft lifting assemblies 22 and 24, respectively.

Referring to FIGS. 1, 2, 3 and 4, the lift assemblies 10 typically is comprised of a non-rotational jack screw 26 which has fixably connected at its upper end, a lift plate 28.

To raise or lower the seat adjuster 10, gear 30 is rotated, causing gear 32 to follow. Jack screw 26, attached with top plate 28 by nut 34 is restrained from rotating and is therefore raised or lowered.

One of the lift plates 28 typically will be slottably connected with the top plate 14. The other lift assembly will typically be slottably connected with the top plate 20 as the embodiment illustrated in FIG. 1 at reference 15 or in the alternative embodiment seat adjuster 23 illustrated in FIG. 6 with the rigid link 17.

Figure 5:
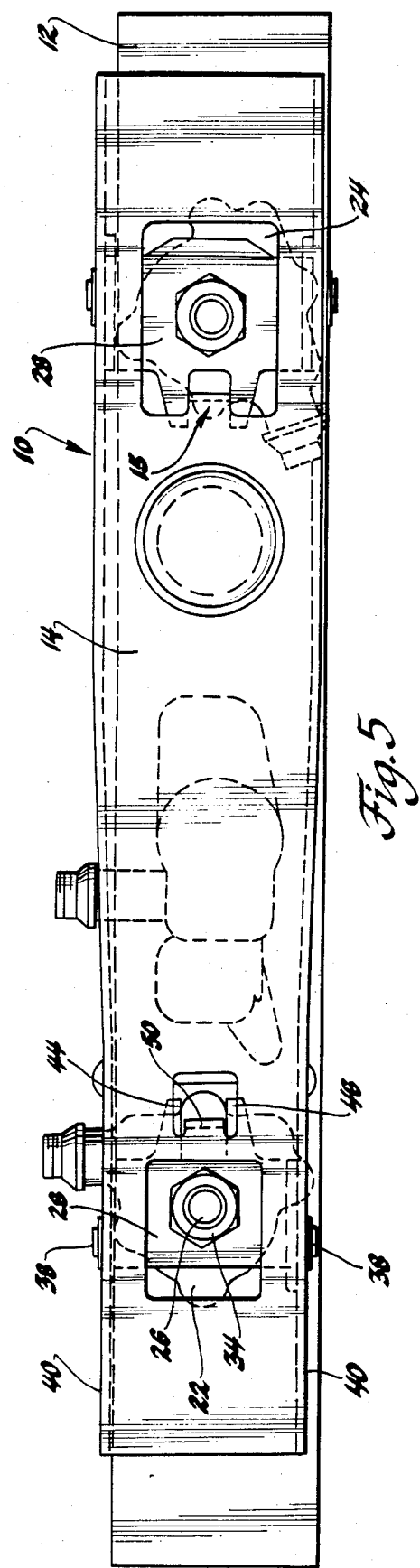
FIG. 5 is a top elevational view illustrating a finger of the top plate pointed downward.

The top plate is slottably connected with the lift plate by horizontally projecting rivet or pin(s) 38 from the top plate channel sides 40 which are captured by the slotted apertures 42 of the lift plate 28. Between the overlifting channel sides 40 of the top plate 14 and the lift plate 28, there exists a slight clearance which allows the jack screw 26 to rotate slightly towards the end of its travel, if not restrained, thereby causing interference and freezing between the top plate 14 and lift plate 28. To provide torsional stabilization the lift plate has projecting from it, two finger-like or fork projections 44 and 46 shown in FIGS. 4 and 5. Captured between the finger-like projections of the lift plate is a bent finger-like or tongue projection 50 of the top plate.

In the method of utilizing and operation thereof, the seat adjuster changes the altitude of the seat by raising and lowering the jack screw(s) 26. Towards the end of the travel the jack screw 26 will have a tendency to attempt to rotate thereby rotating the lift plate into an interference position with the top plate as mentioned previously. However, the sliding finger interlocking connection lift plate projections 46 and 44 with the finger 50 of the top plate will restrain the left plate 28 from rotating thereby providing torsional stabilization for the lift plate. Since the connection between the lift plate 28 and top plate 14 is an interlocking one, torsional stabilization will be provided in both directions. Thereby torsional stability will be maintained when the jack screw 26 is towards the end of its maximum extension as well as towards the end of its maximum retraction.

The identical stabilization operation is performed in the alternative embodiment 23 by a sliding finger interlocking connection between the rigid link 17 and the lift plate 35 as illustrated at 41.

FIG. 7 illustrates an alternative embodiment 110 with a restraining member 127 which interlocks with the lift plate 128 but is firmly attached to the floor plate 112 thereby eliminating the necessity for interlocking of the lift plate 128 with the top plate 114 or with the rigid link.

While a few of the embodiments of the present invention have been explained, it will be readily apparent to those skilled in the art of the various modifications which can be made to the present invention without departing from the spirit and scope of this application as it is encompassed by the following claims.

The embodiments of the invention in which an exclusive property or privilege is claimed are defined as follows:

1. A seat adjuster comprising:
   A floor plate;
   a support assembly including a top plate having an upper surface generally parallel to said floor plate and a rigid link pivotally connected with said top plate and said floor plate, and said support assembly having a side surface generally perpendicular to said floor plate and to said top plate upper surface;
   a first lift assembly fixably connected with said floor plate, said assembly including a jack screw fixably attached to a first lift plate, said lift plate being slottably connected with said side surface;
   and means for torsionally restraining said first lift plate whereby said first lift plate is prevented from freezing with said side surface.

2. A seat adjuster as described in claim 1 further including a second lift assembly fixably connected with said floor plate with a second jack screw fixably attached to a second lift plate, said second lift plate being slottably connected with said side surface, and said seat adjuster also including means for torsionally restraining said second lift plate whereby said second lift plate is prevented from freezing with said side surface.

3. A seat adjuster as described in claim 1, wherein said side surface has connected thereto a generally horizontally projecting pin which is captured within a slot of said first lift plate.

4. A seat adjuster as described in claim 3, wherein said slot is in a side surface of said top plate.

5. A seat adjuster as described in claim 1, wherein said lift plate is channel-shaped with two parallel opposing slots in said channel sides and wherein said first top plate has opposing pins captured within said respective slots.

6. A seat adjuster as described in claim 1, wherein said lift plate has a side surface and said rigid link has a projecting pin captured in a slot in said lift plate side surface.

7. A seat adjuster as described in claim 1 wherein said means for torsionally restraining said first lift plate includes a restraining member fixably connected to and projecting from said floor plate having a slotted finger connection with said lift plate.

8. A seat adjuster comprising a floor plate;
   a rigid link pivotally connected with said floor plate along said rigid link's first end;
   a top plate pivotally connected with said rigid link along said rigid link second end, said top plate being channel-shaped with first and second sets of horizontally projecting pins in said channel walls;
   a first lift assembly fixably connected with said floor plate including a jack screw fixably attached to a first lift plate, said first lift plate having side slots capturing said first set of projecting pins of said top plate, said first lift plate being torsionally restrained by an interlocking finger connection with said top plate; and
   a second lift assembly fixably connected with said floor plate, said second lift assembly including a jack screw fixably connected to a second lift plate, said second lift plate having side slots capturing said second set of projecting pins of said top plate, and said second lift plate being torsionally restrained by an interlocking finger connection with said top plate.

9. A seat adjuster as described in claim 8 wherein a middle finger of said top plate is captured between two opposing fingers of said lift plate.

10. A seat adjuster comprising:
a floor plate;
a rigid link pivotally connected to said floor plate along said rigid link first end, said rigid link being channel-shaped with two horizontally projecting pins in the channel sides of said rigid link;
a top plate pivotally connected with said rigid link along said rigid link second end, said top plate being channel-shaped with two horizontally projecting pins along the channel sides of said top plate;
a first jack screw fixably attached to said floor plate;
a lift plate fixably attached to said first jack screw having slotted sides capturing said projecting pins of said rigid link, and having a sliding finger connection with a portion of said rigid link torsionally restraining said first lift plate;
a second jack screw fixably connected to said floor, a second lift plate fixably attached to said second jack screw having slots along its side capturing said horizontal projecting pins of said top plate and having an interlocking finger connection with said top plate to torsionally restrain said second lift plate.

11. A method of vertically adjusting a seat comprising,
pivotally connecting a rigid link with a top plate having a side surface and a floor plate;
pivotally and slidably connecting said top plate with a set of separated, fixably attached to said floor plate lift assemblies using horizontally extending pins, said lift assemblies including a jack screw and a fixably attached lift plate;
vertically displacing said jack screw;
and torsionally restraining at least one of said lift plates by said top plate by interlocking a fork of said top plate into a sliding fork connection with said lift plate.

12. A method as described in claim 11 further comprising restraining both lift plates by said top plate by interlocking a respective fork of said top plate into a sliding fork connection of said respective lift plate.

13. A method of vertically adjusting a seat comprising,
pivotally connecting a rigid link with a top plate and floor plate,
pivotally and slidably connecting said rigid link with a fixably attached to said floor plate lift assembly using horizontally extending pins, said lift assembly including a first jack screw and a fixably attached first lift plate;
pivotally and slidably attaching said top plate with a second lift assembly;
vertically displacing said jack screw; and
torsionally restraining at least said first lift plate by interlocking a fork of said top plate into a sliding fork connection with said first lift plate.

* * * * *